United States Patent [19]

Isa et al.

[11] 4,002,470

[45] Jan. 11, 1977

[54] PROCESS FOR RECOVERING RUTHENIUM

[75] Inventors: Isao Isa, Misato; Tutomu Takahashi, Shibukawa, both of Japan

[73] Assignee: The Japan Carlit Co., Ltd., Tokyo, Japan

[22] Filed: Nov. 18, 1975

[21] Appl. No.: 633,096

[30] Foreign Application Priority Data

Dec. 10, 1974 Japan .............................. 49-141809
Dec. 10, 1974 Japan .............................. 49-141810
Dec. 10, 1974 Japan .............................. 49-141811

[52] U.S. Cl. .............................. 75/101 R; 75/121; 423/22

[51] Int. Cl.$^2$ .................... C22B 61/00; C01G 55/00

[58] Field of Search .......... 423/22; 75/101 R, 97 R, 75/121

[56] References Cited

UNITED STATES PATENTS 2,860,956  11/1958  Arden et al. ......................... 423/22
3,332,771  7/1967  Heidt .................................... 75/121

OTHER PUBLICATIONS

Wilson, "Nuclear Science Absts.," vol. 11, No. 20 supplement, p. 1289, Oct. 1957.

*Primary Examiner*—Herbert T. Carter
*Attorney, Agent, or Firm*—Flynn & Frishauf

[57] ABSTRACT

From a ruthenium-containing substance, sparingly soluble in any of water, acid solutions and basic solutions, flaked off used metal electrodes comprising a substrate of a corrosion-resistant metal coated with ruthenium metal or a compound thereof, ruthenium is recovered in the form of metal or a compound thereof, soluble in such media as described hereabove, easily and with a high percent recovery by means of a combination of simple chemical procedures and also inexpensive chemicals and in a short period of time. The recovered ruthenium metal or compound thereof can be reused for recoating used metal electrodes and the like.

22 Claims, 1 Drawing Figure

PROCESS FOR RECOVERING RUTHENIUM

BACKGROUND OF THE INVENTION

This invention relates to a process for recovering ruthenium easily and in a satisfactory yield from a material sparingly soluble in water, acid solutions and basic solutions.

Metal electrodes comprising a substrate of a corrosion-resistant metal such as titanium, zirconium, tantalum or niobium coated with electro-conductive and corrosion-resistant ruthenium metal or compounds thereof have come into common use in recent years due to their superior chlorine overvoltage characteristics and dimensional stability as an anode. While the rate of consumption of such an electrode may be low, it is desirable to interrupt its use after a suitable length of service in an electrolytic cell and recoat the electrode in order to maintain the highest efficiency.

Since ruthenium is one of the most expensive of the platinum group elements due to its extremely limited availability, ruthenium contained in the coated layer removed from the substrate should be recovered and be reused.

For this purpose, ruthenium should be recovered in the form of metal or compound thereof, soluble either in water, an acid solution or a basic solution, because it is common practice to apply coating compositions in solution on to the substrate in manufacturing metal electrodes. If, for instance, some insoluble substance such as ruthenium dioxide is present in the coating composition, coarse grains are formed on the surface of the electrode which prevent formation of a strong, uniform coating layer of ruthenium oxide.

A prior art process for recovering platinum metals used in coating metal electrodes is described in Japanese patent publication No. 26967/71 relating to a process in which a used electrode coating is removed by electrolysis in a molten salt. However, the use of highly corrosive molten salts in said process necessitates the use of special materials for the electrode and the electrolytic cell. The electrolysis of molten salts also requires complicated design and operating technology as well as high installation and operating costs.

It is an object of this invention to provide a process for efficiently recovering ruthenium from a ruthenium-containing substance sparingly soluble in any of water, acid solutions and basic solutions by simple chemical procedures in combination with the use of inexpensive chemicals.

It is another object of this invention to provide a process for recovering ruthenium in the form of metal or a compound thereof, soluble either in water, an acid solution or a basic solution.

It is still another object of this invention to provide a process for efficiently recovering pure ruthenium or compounds thereof from a ruthenium-containing substance soluble in any of water, acid solutions and basic solutions and having impurities soluble in any of water, acid solutions and basic solutions by simple chemical procedure in combination with the use of inexpensive chemicals.

It is still another object of this invention to provide a process for recovering ruthenium by using simple chemical treatments and inexpensive chemicals without employing any special materials of construction or complicated design and operating technology.

Other objects and advantages of the present invention will become apparent to those skilled in the art from the following description and disclosure.

SUMMARY OF THE INVENTION

This invention relates to a process for recovering ruthenium metal or a compound thereof which comprises treating a ruthenium-containing substance, sparingly soluble in any of water, an acid solution and a basic solution, with an alkaline fusion mixture containing an inorganic peroxide, dissolving the fusion product in a first acid solution, then oxidizing the resulting solution with an oxidizing agent added to a second acid solution to liberate ruthenium tetroxide, carrying out oxidizing distillation of the resulting product under a reduced pressure to collect the distillate in a third acid or alkaline solution, reducing the collected product, and recovering ruthenium in the form of metal or a compound soluble either in water, an acid solution or a basic solution.

The invention also includes a sequence in which the alkaline fusion step is omitted, as described below.

DETAILED DESCRIPTION OF THE INVENTION

Embodiments of this invention are explained in each step as described hereafter.

Step I: a step wherein a ruthenium-containing substance, sparingly soluble in any of water, an acid solution and a basic solution, is treated in an alkaline fusion mixture and the fusion product is dissolved in a first acid solution (Dissolution Step).

Step II: a step wherein the resulting solution is oxidized to liberate ruthenium tetroxide in a second acid solution containing an oxidizing agent, and then distilled under a reduced pressure (Oxidizing Distillation Step).

Step III: a step wherein the distillate is collected in a third acid or basic solution (Collecting Step).

Step IV: a step wherein the collected product is reduced to a ruthenium in the form of metal or a compound thereof having a lower valency (Reducing Step).

Step V: a step wherein ruthenium metal or a ruthenium compound is recovered in a solid form (Recovering Step).

In Step I (Dissolution Step) of this invention, a ruthenium-containing substance, sparingly soluble in any of water, an acid solution and a basic solution, is treated with an alkaline fusion mixture containing from 10 to 70% by weight of an inorganic peroxide at a temperature of from 250° to 750° C, and the fusion product is cooled and then dissolved in a first acid solution.

The inorganic peroxide is selected from the group consisting of sodium peroxide, potassium peroxide, cesium peroxide, calcium peroxide, strontium peroxide, barium peroxide and a mixture of two or more thereof. The alkaline fusion mixture is a combination of an inorganic peroxide and an alkaline compound which is selected from the group consisting of lithium hydroxide, sodium hydroxide, potassium hydroxide, sodium carbonate, potassium carbonate and a mixture of two or more thereof.

The preferred acid of the first acid solution used to dissolve the fusion product is selected from the group consisting of sulphuric acid, phosphoric acid, nitric acid, perchloric acid, periodic acid, formic acid and acetic acid. However, if a hydrohalogenic acid is used, it should be removed before the succeeding oxidizing distillation step and the remaining solution should be made acid with an acid e.g. phosphoric acid. But when the rate of dissolution of said fusion product into the acid solution is too fast, ruthenium tetroxide can be formed due to the temperature rise and it is lost as a gas to cause a loss of ruthenium and to lower the percent recovery of ruthenium. On the other hand, when the rate of dissolution is too slow, the dissolution step can take too long to be tolerable in a commercial operation. Therefore, an optimum rate of dissolution should be attained by a suitable choice of such important factors as the amount of the peroxide to be added, the temperature and time of treatment, and the strength of the acid solution.

The amount of the fusion mixture used in this invention is preferably from 1 to 2000 parts by weight per 1 part by weight of ruthenium as metal. If the amount of the fusion mixture is less than 1 part by weight, the alkali fusion of ruthenium becomes difficult. On the other hand, even when the amount of the fusion mixture is more than 2000 parts by weight, no particular advantage is expected, but a disadvantage in economy results. The peroxide content of said fusion mixture is preferably from 10 to 70% by weight. If it is below 10% by weight, the rate of dissolution of the alkali fusion product into the acid solution is decreased. On the other hand, if it is above 70% by weight, a dangerously vigorous reaction can occur upon dissolution of the alkali fusion product in the acid solution. The preferred temperature and time of alkali fusion is from 250° to 750° C and from 5 to 600 minutes, respectively. If the temperature is below 250° C, the alkali fusion proceeds more slowly. On the contrary, if it is higher than 750° C, decomposition of the inorganic peroxide occurs and the rate of dissolution of the fusion product into the acid solution will become slower. If the time is shorter than 5 minutes, the alkali fusion will proceed only incompletely. On the other hand, if it is longer than 600 minutes the rate of dissolution of the fusion product into the acid solution becomes slower. The strength of the acid solution used for dissolving the fusion product is preferably from 2 to 50% by weight. If it is below 2% by weight, the rate of dissolution of the fusion product into the acid solution becomes slower. On the other hand, if it is above 50% by weight, the rate of dissolution becomes too rapid and a rapid temperature rise can cause a loss of ruthenium as ruthenium tetroxide resulting in a decrease of the percent recovery.

In Step II (Oxidizing Distillation Step) of this invention, a solution containing fused ruthenium compounds obtained in the dissolution step is oxidized to ruthenium tetroxide in a second acid solution containing an oxidizing agent, and ruthenium tetroxide is then distilled under a reduced pressure.

The oxidizing agent to be employed is selected from the group consisting of potassium permanganate, potassium dichromate, sodium bismuthate, ammonium persulphate, sodium peroxide, lead peroxide, ceric sulphate, sodium perchlorate and a mixture of two or more thereof.

As the acid of the second acid solution, an inorganic or organic acid having no reducing property, such as sulphuric acid, phosphoric acid, nitric acid, perchloric acid, acetic acid or trifluoroacetic acid, and mixtures thereof can be employed. The strength of the acid solution is desirably from 1 to 90% by weight. If the concentration used is less than 1% by weight, the oxidation will proceed too slowly resulting in extending the distillation time. On the other hand, when the concentration is higher than 90% by weight, no particular improvement will be recognized and it will cost more.

The preferred temperature for the oxidizing distillation is from 50° to 90° C, and the preferred pressure is from 90 to 700 mmHg. If the temperature is below 50° C, a longer time for oxidizing distillation is required. On the other hand, if the temperature is higher than 90° C, a part of the ruthenium tetroxide decomposes during the distillation and sticks to the walls of the distillation apparatus, which lowers the percent recovery of ruthenium. If the pressure is below 90 mmHg, the distillation should be carried out at a temperature below 50° C; thus a longer time will be required for completely oxidizing the ruthenium compounds into ruthenium tetroxide and therefore for distilling all the ruthenium tetroxide liberated. On the other hand, at a pressure higher than 700 mmHg, a distillation temperature higher than 90° C becomes necessary, thereby causing partial decomposition of ruthenium tetroxide during the distillation and leading to a loss of the percent recovery of ruthenium.

The amount of the oxidizing agent to be employed is from 1 to 2000 parts by weight per 1 part by weight of ruthenium as metal. If the amount used is less than 1 part by weight, the oxidation proceeds too slowly resulting in extension of the distillation time. On the contrary, when the amount is more than 2000 parts by weight, no particular advantage but a disadvantage in economy results.

Furthermore, it is desirable to carry out the distillation in a gas stream of a stabilizing agent which prevents decomposition of ruthenium tetroxide in order to increase the yield of the oxidizing distillation step. Oxygen, chlorine, carbon dioxide or nitrogen can be employed as the stabilizing agent for ruthenium tetroxide.

In Step III (Collecting Step) of this invention, ruthenium tetroxide liberated in the oxidizing distillation step is collected in an absorbing solution. Preferred absorbing solutions are water and aqueous solutions of hydrogen halides or alkali metal hydroxides, for example, aqueous solutions of hydrochloric acid, hydrobromic acid, hydrofluoric acid, hydroiodic acid, sodium hydroxide, potassium hydroxide, lithium hydroxide, etc. The preferred concentration of hydrogen halide is from 1 to 40% by weight, and the preferred concentration of hydroxide is from 1 to 50% by weight.

In Step IV (Reducing Step) of this invention, ruthenium tetroxide is reduced to a halogenated ruthenic acid if an aqueous solution of a hydrohalogenic acid is used as an absorbing solution in the collecting step. On the other hand, it will be reduced to a ruthenate if an alkali metal hydroxide is used in the absorbing solution. The halogenated ruthenic acid or ruthenate is reduced to a Ru(III) compound first by acidifying the absorbing solution if basic, and then by adding a lower alcohol thereto and heating the mixture. Sulphuric acid, nitric acid, hydrochloric acid, phosphoric acid or acetic acid can be used for acidifying the absorbing solution. Acids having lower boiling points such as hydrochloric acid, nitric acid, acetic acid, etc. are preferred if it is desired to recover ruthenium in a solid form, because a step of concentration or drying by evaporation is necessary in such a case. The preferred lower alcohol to be employed as a reducing agent is selected from the group consisting of methyl alcohol, ethyl alcohol, propyl alcohol, n-butyl alcohol, isopropyl alcohol, and isobutyl alcohol.

The concentration ranges of acids and lower alcohols to be used are from 1 to 40% by weight and from 1 to 80% by weight, respectively. The preferred temperature for the reducing step is from 40° to 150° C. If the concentration of the acid and the lower alcohol or the temperature is lower than those specified hereinabove, the reduction proceeds slowly and a longer time is required for the reaction. However, even if they are higher than the upper limits, no particular improvement but a disadvantage in economy results. Particularly, when the temperature is higher than 150° C, the reducing mixture can be splashed away and the percent recovery suffers a loss.

Alternatively, if ruthenium tetroxide is collected in an alkali metal hydroxide solution, ruthenium can also be recovered as metal by adding aqueous ammonia or an ammonium salt to the absorbing solution containing a ruthenate by precipitating ammonium ruthenate, by filtering and then by drying the precipitate formed therein. Metallic ruthenium can be prepared by reducing the Ru(III) compound thus obtained with hydrogen.

In Step V (Recovering Step) of this invention, ruthenium is recovered in the form of a solid Ru(III) compound by evaporating the reducing mixture containing the Ru(III) compound obtained in the reducing step to dryness in air or an inert gas under atmospheric or a reduced pressure. The evaporation to dryness is carried out preferably at a temperature below 200° C when it is carried out in air either under atmospheric pressure or under a reduced pressure, or below 400° C when it is carried out in a stream of an inert gas, because Ru(III) compounds can undergo atmospheric oxidation at elevated temperatures and form insoluble ruthenium dioxide. Preferred inert gases are nitrogen, argon, carbon dioxide, etc.

Thus, in accordance with this invention, precious ruthenium is efficiently recovered in the form of metal or a compound thereof, soluble either in water or in a third acid solution or a basic solution, by using simple chemical treatments and inexpensive chemicals without employing any special materials of construction or complicated design and operating technology. The percent recovery of ruthenium thereof from used metal electrodes is as high as 90% or above.

The process of this invention can also be applied to ruthenium metal or compounds thereof dissolved out into the electrolyte from a metal electrode coated with ruthenium metal or compounds thereof during an electrolytic process. In such a case, Steps II through V are to be followed.

While ruthenium recovered in the form of metal or a compound thereof, soluble either in water, an acid solution or a basic solution, is most suitably reused for recoating used metal electrodes, any of the absorbing solutions obtained in the collecting step of this invention, Ru(III) compounds in solution obtained in the reducing step and ammonium ruthenate precipitated from the basic absorbing solution, can equally be employed for the same purpose.

Embodiments of this invention are illustrated in detail in the following examples. It should be understood that this invention is, however, in no way limited by the Examples, which are given only for the purpose of illustration of this invention.

EXAMPLE 1

A used electrode made of a titanium substrate coated with oxides of ruthenium was used as an anode and was treated anodically by the use of a steel cathode in a sodium sulphate solution (5% by weight), at an anodic current density of 30 A/dm$^2$ for 9 hours. The mixture containing oxides of ruthenium and titanium flaked off from the substrate during the anodic treatment, was charged into an iron crucible, and 15 g of sodium hydroxide and 5 g of sodium peroxide were added thereto; then the resulting mixture was heated in an electric furnace at 500° C for 2 hrs. The crucible was then taken out of said furnace. After cooling, the fusion product as contained in the crucible was put into 250 ml of an aqueous solution of phosphoric acid (15% by weight). The contents of the crucible were dissolved completely within 5 minutes, releasing bubbles.

EXAMPLES 2 – 11

The procedure described in Example 1 was repeated except that the conditions were different as described in the following Table 1. The time required for completely dissolving the fusion product in the acid solution is also shown therein.

Table 1

| | Fusion mixture | | | | Treating conditions | | | | Time for dissolution (min.) |
|---|---|---|---|---|---|---|---|---|---|
| Example | Alkali metal hydroxides | Amount added (g) | Inorganic peroxides | Amount added (g) | Temp. (° C) | Time (min.) | Acids | Concn. (wt.%) | |
| 2 | NaOH | 15 | $Na_2O_2$ | 5 | 500 | 120 | $H_3PO_4$ | 5 | 6 |
| 3 | NaOH | 15 | $Na_2O_2$ | 5 | 500 | 120 | $H_3PO_4$ | 33 | within 5 |
| 4 | NaOH | 15 | $Na_2O_2$ | 3 | 500 | 120 | $H_3PO_4$ | 15 | 182 |
| 5 | NaOH | 5 | $Na_2O_2$ | 5 | 500 | 120 | $H_3PO_4$ | 15 | within 5 |
| 6 | NaOH | 15 | $Na_2O_2$ | 5 | 400 | 120 | $H_3PO_4$ | 15 | within 5 |
| 7 | NaOH | 15 | $Na_2O_2$ | 5 | 700 | 120 | $H_3PO_4$ | 15 | 25 |
| 8 | NaOH | 15 | $Na_2O_2$ | 5 | 500 | 30 | $H_3PO_4$ | 15 | within 5 |
| 9 | NaOH | 15 | $Na_2O_2$ | 5 | 500 | 500 | $H_3PO_4$ | 15 | 9 |
| 10 | KOH | 15 | $Na_2O_2$ | 5 | 500 | 120 | $H_3PO_4$ | 15 | 7 |
| 11 | NaOH | 15 | $Na_2O_2$ | 5 | 500 | 120 | $H_2SO_4$ | 15 | 6 |

REFERENCE EXAMPLE 1 1

The anodic treatment was carried out under the same conditions as in Example 1. The flakes were charged into an iron crucible, 15 g of sodium hydroxide and 1 g of sodium peroxide were added thereto, and the resulting mixture was heated at 500° C for 2 hrs. Then the crucible and the contents thereof were put in 250 ml of an aqueous solution of phosphoric acid (5% by weight). No dissolution was observed even after 3 days.

REFERENCE EXAMPLE 2

The anodic treatment was carried out under the same conditions as in Example 1. The flakes were charged into an iron crucible, and 15 g of sodium hydroxide and 5 g of sodium peroxide were added thereto, then the resulting mixture was heated at 500° C for 2 hrs. The crucible and the contents thereof were put in water, but no dissolution was observed even after 3 days. The it was put in 250 ml of an aqueous solution of phosphoric acid (1% by weight), but still no dissolution was observed.

EXAMPLE 12

To 20 ml of the phosphoric acid solution containing fused ruthenium compounds obtained by the treatment described in Example 1 were added 15 ml of phosphoric acid and 1 g of ammonium persulphate. Nitrogen was introduced therein under 374 mmHg at 74.5° to 75° C and at a flow rate of 200 ml/min. Oxidizing distillation was thus carried out and ruthenium was recovered with a percent recovery of 98.3% and a percent loss of 1.7%, where, $$\text{Percent recovery of ruthenium} = \frac{\text{The amount of the recovered ruthenium}}{\text{The amount of the used ruthenium}} \times 100,$$

$$\text{Percent loss of ruthenium} = \frac{\text{(The amount of ruthenium used)} - \text{(The amount of ruthenium recovered)}}{\text{(The amount of ruthenium recovered)}} \times 100.$$

EXAMPLE 13

Ten mg of commercially available ruthenium trichloride was dissolved in 20 ml of water, 15 ml of phosphoric acid (85% by weight) and 2 g of potassium permanganate were added thereto, and the resulting mixture was diluted with water to 100 ml. Oxygen was introduced therein at 100 ml/min., and the mixture was subjected to an oxidizing distillation under 350 mmHg and at a temperature of from 76° to 77° C. A 6 N hydrochloric acid solution was used as an absorbing solution for ruthenium tetroxide. Ruthenium trichloride was converted to ruthenium tetroxide and was distilled out as such in 30 minutes. The percent recovery of ruthenium under these conditions was 98.9% and the percent loss was 1.1%.

EXAMPLES 14 – 17 AND REFERENCE EXAMPLES 3 – 4

The procedure described in Example 13 was followed except for the pressure during the oxidizing distillation and the temperature.

The results obtained are given in Table 2 following.

Table 2

| Example (Reference example) | Distillation conditions | | Results | |
|---|---|---|---|---|
| | Pressure (mmHg) | Temperature (° C) | Percent recovery (%) | Percent loss (%) |
| 14 | 150 | 59–61 | 98.3 | 1.7 |
| 15 | 240 | 68–70 | 98.3 | 1.7 |
| 16 | 345 | 74–75 | 98.3 | 1.7 |

Table 2-continued

| Example (Reference example) | Distillation conditions | | Results | |
|---|---|---|---|---|
| | Pressure (mmHg) | Temperature (° C) | Percent recovery (%) | Percent loss (%) |
| 17 | 520 | 85 | 97.2 | 2.8 |
| (3) | 710 | 96–97 | 96.6 | 3.4 |
| (4) | 760 | 105–107 | 90.0 | 10.0 |

Figure 1:
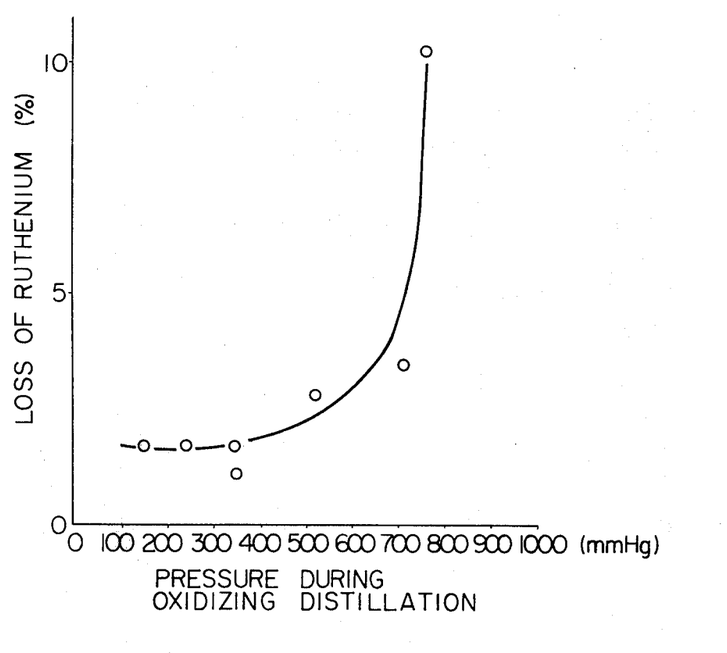
The FIGURE shows the relation between the pressure under which oxidizing distillation is carried out and the percent loss of ruthenium.

The relation between the pressure during the oxidizing distillation and the percent loss of ruthenium obtained in Examples 13 – 17 and Reference Examples 3 – 4 hereinbefore described is illustrated in the appended FIGURE.

EXAMPLE 18

Ten mg of commercially available ruthenium trichloride was dissolved in 20 ml of water, and 15 ml of phosphoric acid (85% by weight) and 2 g of lead peroxide were added thereto. The mixture was then diluted with water to 100 ml. Gaseous chlorine was introduced therein at 200 ml/min., and an oxidizing distillation was carried out under 350 mmHg and at a temperature of from 76° to 77° C for 30 minutes. A 6 N hydrochloric acid solution was used as an absorbing solution for the absorption of ruthenium tetroxide. The percent recovery and the percent loss of ruthenium under these conditions were 98.4% and 1.6%, respectively.

EXAMPLE 19

Ten mg of commercially available ruthenium trichloride was dissolved in 20 ml of water, and 15 ml of phosphoric acid (85% by weight) and 2 g of ceric sulphate were added thereto. The mixture was then diluted with water to 100 ml. Gaseous carbon dioxide was introduced therein at 200 ml/min., and then oxidizing distillation was carried out under 350 mmHg and at a temperature of from 75° to 76° C for 30 minutes. A 6 N hydrochloric acid was used as an absorbing solution for ruthenium tetroxide. The percent recovery and the percent loss of ruthenium were 97.9% and 2.1%, respectively.

EXAMPLE 20

Ten ml of 6 N hydrochloric acid containing the ruthenium compounds formed in the collecting step in Example 13 described hereinbefore was taken, and 40 ml of ethyl alcohol, 5 ml of 12 N hydrochloric acid and 35 ml of water were added thereto.

The temperature of the mixture was maintained at 80° C for 1 hour. By a spectroscopic test of the mixture, ruthenium was recognized to have been almost completely reduced to Ru(III).

The composition of the reducing solution in this case corresponded to 35% by weight of ethyl alcohol and 4.8% by weight of hydrochloric acid.

EXAMPLES 21 – 23

Procedures described in Example 20 were repeated except that different compositions of the reducing solution were used. The results are shown in Table 3 following.

Table 3

| Examples | Composition of the reducing solution | | Reducing time (hrs.) |
|---|---|---|---|
| | $C_2H_5OH$ (% by weight) | HCl (% by weight) | |
| 21 | 13 | 18 | 1 |
| 22 | 28 | 1.8 | 4 |
| 23 | 39 | 1.3 | 2 |

EXAMPLE 24

A used electrode comprising a titanium substrate coated with oxides of ruthenium was treated anodically in a solution of sodium sulphate (5% by weight) for 9 hours at an anodic current density of 30 A/dm² by the use of a steel cathode. The mixture containing oxides of ruthenium and titanium flaked off the substrate, was charged into an iron crucible. Fifteen g of sodium hydroxide and 5 g of sodium peroxide were added thereto, and the mixture was heated in an electric furnace maintained at 400° C for 2 hrs. After cooling, the fusion product as contained in the crucible was put into 250 ml of an aqueous phosphoric acid solution (15% by weight). The contents of the crucible were dissolved therein releasing bubbles, and the dissolution was completed within 5 minutes.

To the resulting solution, 150 ml of phosphoric acid (85% by weight) and 20 g of potassium permanganate were added, and then the solution was diluted with water to 1 liter. Then, oxidizing distillation was carried out under 350 mmHg and at 75° C, and the distillate was collected in 500 ml of 6 N hydrochloric acid. Ruthenium tetroxide was reduced to chlorinated ruthenic acid and the color of the solution changed from colorless to dark brown. The solution was then reduced at 80° C after addition of 100 ml of ethyl alcohol to convert chlorinated ruthenic acid to a Ru(III) chloride. The solution became pale reddish-brown as the reduction proceeded. The solution was then transferred to an evaporating dish and was evaporated to dryness on a sand bath at 150° C. Thus, 0.35 g of dark green crystals having 48% by weight of ruthenium as metal were obtained. Said crystals were readily soluble in water and in hydrochloric acid. The percent recovery of ruthenium was 90.1%.

Further, 0.31 g of said crystals were mixed with 1.08 g of tetra-n-butyl titanate, 2.23 ml of n-butanol, and 0.145 ml of hydrochloric acid, and were dissolved therein. The solution was applied on a titanium substrate and dried in air at 500° C for 10 minutes. A metal electrode coated with oxides of ruthenium thus prepared was employed as an anode for the electrolysis of chlorate by the use of a steel cathode at a current density of 30 A/dm². The current efficiency was 92.1% and the cell voltage was 3.22 V.

EXAMPLE 25

Twenty mg of a mixture of ruthenium trichloride and titanium trichloride, which contained 27.9% by weight of ruthenium as metal, was dissolved in 20 ml of water, 15 ml of phosphoric acid (85% by weight) and 2 g of potassium permanganate were added thereto, and the resulting mixture was diluted with water to 100 ml. Oxygen was introduced therein at 100 ml/min., and the mixture was subjected to oxidizing distillation under 350 mmHg and a temperature of from at 76° to 77° C. A 6 N hydrochloric acid solution was used as an absorbing solution for ruthenium tetroxide. Ruthenium trichloride was converted to ruthenium tetroxide and was distilled out as such in 30 minutes.

Then, 100 ml of ethyl alcohol, 50 ml of 12 N hydrochloric acid and 100 ml of water were added to the 6 N hydrochloric acid solution containing the ruthenium compounds.

The temperature of mixture was maintained at 80° C for 1 hour. By a spectroscopic test of the mixture, ruthenium was recognized to have been almost completely reduced to Ru(III). The composition of the reducing solution in this case corresponded to 22.7% by weight of ethyl alcohol and 12.5% by weight of hydrochloric acid.

The resulting solution was then transferred to an evaporating dish and was evaporated to dryness on a sand bath at 150° C. Thus, 11.0 mg of dark green crystals, free from titanium, containing 48% by weight of ruthenium as metal were obtained. The percent recovery of ruthenium was 94.3%.

REFERENCE EXAMPLE 5

A metal electrode coated with oxides of ruthenium was prepared by the use of commercially available ruthenium trichloride and the same procedure as described in Example 24. Electrolysis of chlorate was carried out again under the same conditions as employed in Example 24. The current efficiency was 91.6% and the cell voltage was 3.20 V.

As may be clearly recognized from the embodiments described in the above Examples, the time required for dissolving the sparingly soluble substance containing ruthenium metal or compounds thereof may be shortened when it is treated in an alkaline fusion mixture containing an inorganic peroxide, and said mixture is dissolved in an acid solution. Moreover the percent loss of ruthenium is minimized by oxidization of the resulting solution to ruthenium tetroxide in an acid solution containing an oxidizing agent and distilling ruthenium tetroxide under a reduced pressure.

It has also been ascertained that with the ruthenium compounds recovered in accordance with this invention the results are as satisfactory as those obtained with the commercially available products, because metal electrodes prepared from recovered ruthenium metal or compounds thereof exhibit the same properties as do the electrodes prepared from commercially available ruthenium trichloride.

It has now become possible, in accordance with this invention, to provide a practically applicable process for preparing ruthenium metal or compounds thereof on a large industrial scale from the sparingly soluble substance easily and with a high percent recovery using inexpensive chemicals and in a short period of time without employing any special materials of construction or complicated design and operating technology.

What is claimed is:

1. A process for recovering ruthenium which comprises: treating a ruthenium-containing substance, sparingly soluble in any of water, an acid solution and a basic solution, with an alkaline fusion mixture containing from 10 to 70% by weight of an inorganic peroxide at a temperature of from 250° to 750° C., dissolving the fusion product in a first acid solution with an acid concentration of from 2 to 50% by weight, then oxidizing the ruthenium compound dissolved in the resulting solution in a second acid solution to liberate ruthenium tetroxide, said second acid solution having an acid concentration of from 1 to 90% by weight and containing from 1 to 2000 parts by weight of an oxidizing agent per 1 part by weight of ruthenium as metal, distilling ruthenium tetroxide under a reduced pressure of from 90 to 700 mmHg and at a temperature of from 50° to 90° C. in a gas stream of a stabilizing agent for ruthenium tetroxide, collecting the distillate in a solution selected from the group consisting of a third acid solution and a basic solution, reducing the collected product and recovering from the resulting reduction product ruthenium metal or a compound thereof, soluble either in water, an acid solution or in a basic solution, said stabilizing agent being selected from the group consisting of oxygen, chlorine, carbon dioxide and nitrogen.

2. The process of claim 1 wherein the alkaline fusion mixture is a combination of an inorganic peroxide and an alkaline compound which is selected from the group consisting of lithium hydroxide, sodium hydroxide, potassium hydroxide, sodium carbonate, potassium carbonate and a mixture of two or more thereof.

3. The process of claim 1 wherein the inorganic peroxide is selected from the group consisting of sodium peroxide, potassium peroxide, cesium peroxide, calcium peroxide, strontium peroxide, barium peroxide and a mixture of two or more thereof.

4. The process of claim 1 wherein the acid of said first acid solution is selected from the group consisting of sulphuric acid, phosphoric acid, nitric acid, perchloric acid, periodic acid, formic acid and acetic acid.

5. The process of claim 1 wherein the acid of said second acid solution is selected from the group consisting of sulphuric acid, phosphoric acid, nitric acid, perchloric acid, acetic acid, trifluoroacetic acid and a mixture of two or more thereof.

6. The process of claim 1 wherein the oxidizing agent is selected from the group consisting of potassium permanganate, potassium dichromate, sodium bismuthate, ammonium persulphate, sodium peroxide, lead peroxide, ceric sulphate, sodium perchlorate and a mixture of two or more thereof.

7. The process of claim 1 wherein the acid of the third acid solution is selected from the group consisting of hydrochloric acid, hydrobromic acid, hydrofluoric acid and hydroiodic acid.

8. The process of claim 1 wherein the base of the basic solution for collecting the distillate is selected from the group consisting of sodium hydroxide, potassium hydroxide and lithium hydroxide.

9. In a process for recovering ruthenium from a used metal electrode comprising a substrate of a corrosion-resistant metal coated with ruthenium metal or a compound thereof and for reusing the recovered ruthenium metal or compounds thereof, the improvement which comprises: treating a ruthenium-containing substance, sparingly soluble in any of water, an acid solution and a basic solution, with an alkaline fusion mixture containing from 10 to 70% by weight of an inorganic peroxide at a temperature of from 250° to 750° C., dissolving the fusion product in a first acid solution with an acid concentration of from 2 to 50% by weight, then oxidizing the ruthenium compound dissolved in the resulting solution in a second acid solution to liberate ruthenium tetroxide, said second acid solution having an acid concentration of from 1 to 90% by weight and containing from 1 to 2000 parts by weight of an oxidizing agent per 1 part by weight of ruthenium as metal, distilling ruthenium tetroxide under a reduced pressure of from 90 to 700 mmHg and at a temperature of from 50° to 90° C. in a gas stream of a stabilizing agent for ruthenium tetroxide, collecting the distillate in a solution selected from the group consisting of a third acid solution and a basic solution, reducing the collected product and recovering from the resulting reaction product ruthenium metal or a compound thereof, soluble either in water, an acid solution or in a basic solution, said stabilizing agent being selected from the group consisting of oxygen, chlorine, carbon dioxide and nitrogen.

10. The process of claim 9 wherein the alkaline fusion mixture is a combination of an inorganic peroxide and an alkaline compound which is selected from the group consisting of lithium hydroxide, sodium hydroxide, potassium hydroxide, sodium carbonate, potassium carbonate and a mixture of two or more thereof.

11. The process of claim 9 wherein the inorganic peroxide is selected from the group consisting of sodium peroxide, potassium peroxide, cesium peroxide, calcium peroxide, strontium peroxide, barium peroxide and a mixture of two or more thereof.

12. The process of claim 9 wherein the acid of the first acid solution is selected from the group consisting of sulphuric acid, phosphoric acid, nitric acid, perchloric acid, periodic acid, formic acid and acetic acid.

13. The process of claim 9 wherein the acid of the second acid solution is selected from the group consisting of sulphuric acid, phosphoric acid, nitric acid, perchloric acid, acetic acid, trifluoroacetic acid and a mixture of two or more thereof.

14. The process of claim 9 wherein the oxidizing agent is selected from the group consisting of potassium permanganate, potassium dichromate, sodium bismuthate, ammonium persulphate, sodium peroxide, lead peroxide, ceric sulphate, sodium perchlorate and a mixture of two or more thereof.

15. The process of claim 9 wherein the acid of the third acid solution is selected from the group consisting of hydrochloric acid, hydrobromic acid, hydrofluoric acid and hydroiodic acid.

16. The process of claim 9 wherein the base of the basic solution for collecting the distillate is selected from the group consisting of sodium hydroxide, potassium hydroxide and lithium hydroxide.

17. In a process for recovering ruthenium from a used metal electrode comprising a substrate of a corrosion-resistant metal coated with ruthenium metal or a compound thereof and for reusing the recovered ruthenium metal or compound thereof, the improvement which comprises: treating the ruthenium-containing coating, sparingly soluble in any of water, an acid solution and a basic solution, with an alkaline fusion mixture of sodium hydroxide and from 10 to 70% by weight of sodium peroxide at a temperature of from 250° to 750° C., dissolving the fusion product in a first acid solution of from 2 to 50% by weight of sulphuric acid or phosphoric acid, then oxidizing the ruthenium compound dissolved in the resulting solution in a second acid solution to liberate ruthenium tetroxide, said second acid solution having an acid concentration of from 1 to 90% by weight and containing from 1 to 2000 parts by weight of an oxidizing agent selected from the group consisting of potassium permanganate, potassium dichromate and lead peroxide, per 1 part by weight of ruthenium as metal, distilling ruthenium tetroxide under a reduced pressure of from 90 to 700 mmHg and at a temperature of from 50° to 90° C. in a gas stream of a stabilizing agent for ruthenium tetroxide, collecting the distillate in a hydrochloric acid or sodium hydroxide solution, reducing the collected product and recovering from the resulting reduction product ruthenium metal or a compound thereof, soluble either in water, an acid solution or in a basic solution, said stabilizing agent being selected from the group consisting of oxygen, chlorine, carbon dioxide and nitrogen.

18. A process for recovering pure ruthenium or compounds thereof from a ruthenium-containing substance soluble in any of water, an acid solution and a basic solution and having impurities soluble in any of water, an acid solution and a basic solution, which comprises oxidizing the ruthenium-containing substance to liberate ruthenium tetroxide in an acid solution having an acid concentration of from 1 to 90% by weight and containing from 1 to 2000 parts by weight of an oxidizing agent per 1 part by weight of ruthenium as metal, distilling ruthenium tetroxide under a reduced pressure of from 90 to 700 mmHg and at a temperature of from 50° to 90° C. in a gas stream of a stabilizing agent for ruthenium tetroxide, collecting the distillate in a solution selected from the group consisting of another acid solution and a basic solution, reducing the collected product and recovering from the resulting reduction product pure ruthenium metal or a compound thereof, soluble either in water, an acid solution or in a basic solution, said stabilizing agent being selected from the group consisting of oxygen, chlorine, carbon dioxide and nitrogen.

19. The process of claim 18 wherein the acid of said first-mentioned acid solution is selected from the group consisting of sulphuric acid, phosphoric acid, nitric acid, perchloric acid, acetic acid, trifluoroacetic acid and a mixture of two or more thereof.

20. The process of claim 18 wherein the oxidizing agent is selected from the group consisting of potassium permanganate, potassium dichromate, sodium bismuthate, ammonium persulphate, sodium peroxide, lead peroxide, ceric sulphate, sodium perchlorate and a mixture of two or more thereof.

21. The process of claim 18 wherein the said another acid solution is selected from the group consisting of hydrochloric acid, hydrobromic acid, hydrofluoric acid and hydroiodic acid.

22. The process of claim 18 wherein the base of the basic solution for collecting the distillate is selected from the group consisting of sodium hydroxide, potassium hydroxide and lithium hydroxide.

* * * * *

UNITED STATES PATENT AND TRADEMARK OFFICE
CERTIFICATE OF CORRECTION

PATENT NO. : 4,002,470
DATED : January 11, 1977
INVENTOR(S) : ISAO ISA et al

It is certified that error appears in the above-identified patent and that said Letters Patent are hereby corrected as shown below:

Column 6, line 65: delete "REFERENCE EXAMPLE 11" and replace with --- REFERENCE EXAMPLE 1 ---.

Column 7, line 14: delete "The" and replace with --- Then ---.

*Signed and Sealed this*

*Seventh* Day of *March 1978*

[SEAL]

Attest:

RUTH C. MASON
*Attesting Officer*

LUTRELLE F. PARKER
*Acting Commissioner of Patents and Trademarks*

UNITED STATES PATENT AND TRADEMARK OFFICE
CERTIFICATE OF CORRECTION

PATENT NO. : 4,002,470

DATED : January 11, 1977

INVENTOR(S) : ISAO ISA et al

It is certified that error appears in the above—identified patent and that said Letters Patent is hereby corrected as shown below:

Column 7, line 29: delete in entirety and replace with

--Percent recovery of ruthenium = $\frac{\text{The amount of ruthenium recovered}}{\text{The amount of ruthenium used}} \times 100$--.

Column 7, line 30: delete in entirety and replace with

--Percent loss of ruthenium = $\frac{\text{(The amount of ruthenium used)} - \text{(The amount of ruthenium recovered)}}{\text{(The amount of ruthenium used)}} \times 100$--.

Signed and Sealed this

Twenty-eighth Day of December 1982

[SEAL]

Attest:

GERALD J. MOSSINGHOFF

Attesting Officer — Commissioner of Patents and Trademarks